US011204609B1

(12) United States Patent
Ng et al.

(10) Patent No.: US 11,204,609 B1
(45) Date of Patent: Dec. 21, 2021

(54) ACTIVE BRAKING SYSTEM FOR AN AUTONOMOUS MOBILE DEVICE

(71) Applicant: AMAZON TECHNOLOGIES, INC., Seattle, WA (US)

(72) Inventors: Benny Ng, San Leandro, CA (US); Siddharth Gupta, Redwood City, CA (US); Bruce Robert Woodley, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 229 days.

(21) Appl. No.: 16/451,848

(22) Filed: Jun. 25, 2019

(51) Int. Cl.
| | | |
|---|---|---|
| *G05D 1/02* | (2020.01) |
| *G05D 1/00* | (2006.01) |
| *H02P 3/08* | (2006.01) |
| *H02P 7/29* | (2016.01) |
| *H02P 6/08* | (2016.01) |
| *H02P 6/24* | (2006.01) |

(52) U.S. Cl.
CPC ......... *G05D 1/0238* (2013.01); *G05D 1/0088* (2013.01); *G05D 1/0274* (2013.01); *H02P 3/08* (2013.01); *H02P 7/29* (2013.01); *G05D 2201/0207* (2013.01); *H02P 6/08* (2013.01); *H02P 6/24* (2013.01)

(58) Field of Classification Search
CPC .................................. H02P 7/29; H02P 3/08
USPC ....................................................... 318/1, 34
See application file for complete search history.

(56) References Cited

U.S. PATENT DOCUMENTS

| | | | | |
|---|---|---|---|---|
| 9,586,563 B2* | 3/2017 | Kanai | ........................ | B60T 8/17 |
| 10,153,715 B2* | 12/2018 | Aoki | .......................... | H02P 6/15 |
| 10,286,883 B2* | 5/2019 | Fujiwara | ................... | B60L 7/24 |

* cited by examiner

*Primary Examiner* — David Luo
(74) *Attorney, Agent, or Firm* — Lindauer Law, PLLC

(57) ABSTRACT

An autonomous mobile device (AMD) includes an active braking circuit able to quickly stop the movement of the AMD. For example, the device may stop to avoid an obstacle, upon determining a failure of an internal component, upon receipt of a command, and so forth. Responsive to a signal to stop, an active braking circuit uses sensor data from a driving motor moving with a first rotation to actively commutate that motor to an opposite rotation, bringing the AMD quickly to a stop. In some implementations, the active braking circuit may include an independent power source and motor drivers and operate as a backup to a primary braking system.

20 Claims, 10 Drawing Sheets

LUT0

| IN2 | IN1 | IN0 | OUT |
|---|---|---|---|
| 0 | 0 | 0 | 0 |
| 0 | 0 | 1 | 0 |
| 0 | 1 | 0 | 1 |
| 0 | 1 | 1 | 0 |
| 1 | 0 | 0 | 0 |
| 1 | 0 | 1 | 0 |
| 1 | 1 | 0 | 0 |
| 1 | 1 | 1 | 0 |

LUT1

| IN2 | IN1 | IN0 | OUT |
|---|---|---|---|
| 0 | 0 | 0 | 0 |
| 0 | 0 | 1 | 0 |
| 0 | 1 | 0 | 0 |
| 0 | 1 | 1 | 0 |
| 1 | 0 | 0 | 1 |
| 1 | 0 | 1 | 0 |
| 1 | 1 | 0 | 0 |
| 1 | 1 | 1 | 0 |

LUT3

| IN2 | IN1 | IN0 | OUT |
|---|---|---|---|
| 0 | 0 | 0 | 0 |
| 0 | 0 | 1 | 0 |
| 0 | 1 | 0 | 0 |
| 0 | 1 | 1 | 1 |
| 1 | 0 | 0 | 1 |
| 1 | 0 | 1 | 0 |
| 1 | 1 | 0 | 0 |
| 1 | 1 | 1 | 1 |

LUT4

| IN2 | IN1 | IN0 | OUT |
|---|---|---|---|
| 0 | 0 | 0 | 0 |
| 0 | 0 | 1 | 0 |
| 0 | 1 | 0 | 1 |
| 0 | 1 | 1 | 0 |
| 1 | 0 | 0 | 0 |
| 1 | 0 | 1 | 0 |
| 1 | 1 | 0 | 0 |
| 1 | 1 | 1 | 0 |

FIG. 6

ACTIVE BRAKING SYSTEM FOR AN AUTONOMOUS MOBILE DEVICE

BACKGROUND

Every day a user faces a variety of tasks both personal and work related that need to be attended to. These may include helping in the care of others such as children or the elderly, taking care of a home, staying in contact with others, and so forth. Devices that assist in these tasks may help the user perform the tasks better, may free up the user to do other things, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

FIG. 6 illustrates the inputs and corresponding outputs for several lookup tables (LUTs) used by the active braking circuitry according to some implementations.

Figure 1:
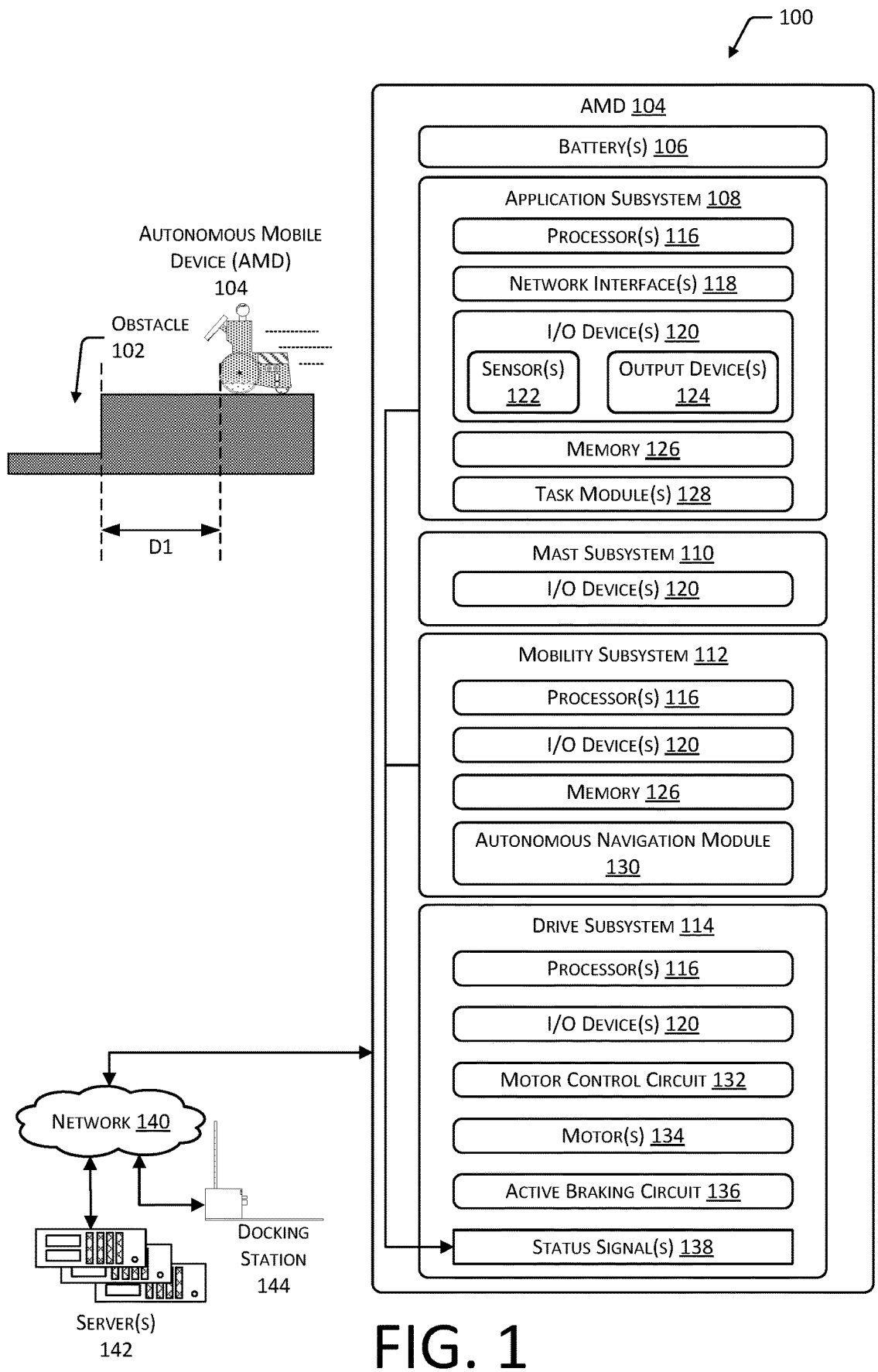
FIG. 1 illustrates a system that includes an autonomous mobile device (AMD), such as a robot, with an active braking system, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

During operation, an autonomous mobile device (AMD) such as a robotic assistant (robot) may perform various tasks. These tasks may include one or more of executing a particular application or moving the AMD. Applications may include particular computer programs comprising instructions, that when executed, perform various functions. For example, a first task may involve the user requesting the AMD to play a particular song using a music application. In another example, a second task may involve the user requesting the AMD to move to a different room. In another example, a third task may involve the user requesting the AMD to initiate a video call and follow the user as they move throughout the home. The AMD is capable of autonomous movement, allowing it to move from one location in the home to another without being "driven" or remotely controlled by the user or other human.

The AMD operates on electrical power provided by a power source, such as one or more rechargeable batteries. The electrical power may then be used to operate one or more motors that are used to move the AMD from one location to another. Other motors may be used to move other parts, such as extending a mast, operating a manipulator arm, and so forth. In one implementation, a motor may comprise a three-phase brushless direct current (BLDC) motor with a shaft that is coupled to a drive wheel. The AMD may include two motors, one driving a left drive wheel and one driving a right drive wheel. By controlling the power provided to the respective wheels, the AMD may be able to rotate, move forward, move backward, and so forth.

During normal operation the AMD may operate the motors to move from one location to another. This operation may include one or more mechanisms for slowing and stopping in the normal course of movement. For example, pulse width modulation (PWM) techniques may be used to control the power to the motors during normal operation. During normal operation, when the AMD slows down a PWM controller may decrease the power delivered to the motors and allow the AMD to come to rest. Other techniques or circuitry may be used to bring the AMD to a stop during normal circumstances. For example, a typical braking may be performed by placing a resistor between two or more terminals on the motor.

However, it may be desirable to provide an active braking system that serves as an alternative or backup system to perform a rapid stop of the AMD in the event that a primary mechanism for stopping is unavailable, inoperative, or ineffective. The rapid stop should decelerate the AMD quickly but without being so fast that the AMD could topple or skid and should be able to operate independently of other systems.

A rapid stop may be initiated responsive to various stop conditions. For example, the stop conditions may include expected collision of the AMD with an object, actual collision of the AMD with an object, receipt of a command to rapidly stop movement of the AMD, failure of one or more components of the AMD, and so forth. In other implementations, other stop conditions may be determined, such as if rotation of a wheel is less than a threshold value.

Described in this disclosure is an active braking circuit that provides a mechanism that is inexpensive and highly effective at bringing the AMD to a rapid stop. The circuitry may be independent of other systems, providing improved redundancy.

In the event a stop condition is signaled, the circuitry will immediately perform a rapid stop by selectively commutating a motor to drive it in a direction opposite its current motion. The circuitry may be implemented as a complex programmable logic device (CPLD) that is configured to accept as inputs a stop signal and signals from position sensors of the motor, such as Hall sensors. Output from the circuitry comprises pulse-width modulated (PWM) signals for particular phases or terminals of the motor. These PWM signals may then be provided to a motor driver which commutates the motor to drive it in a direction opposite a current direction of travel, bringing the AMD quickly to a stop.

While the following descriptions may describe a single motor, it is understood that the system may operate with any number of motors. These motors may comprise multi-phase motors, such as a three or greater phase brushless direct current motor.

When the stop condition is removed and a start or normal condition is obtained, the active braking circuitry is no longer operative. The AMD may now resume normal operation.

By using the active braking circuit described herein, the AMD or other autonomous mobile device has available an alternative mechanism to stop, improving overall safety. Once a stop condition is determined, the latency of the system is extremely low due to the design of the circuitry.

Illustrative System

FIG. 1 illustrates a system 100 in which an obstacle 102 is present in front of a moving autonomous mobile device (AMD) 104 with an active braking circuit, according to some implementations. The obstacle 102 may comprise a step such as shown here, a user, a piece of furniture, and so forth. The AMD 104 may include a battery(s) 106 to provide electrical power for operation of the AMD 104. The battery 106 may be rechargeable, allowing it to store electrical energy obtained from an external source. The techniques described in this disclosure may be applied to other types of power sources, including but not limited to: fuel cells, flywheels, capacitors, superconductors, wireless power receivers, and so forth. For example, instead of a battery 106 the AMD 104 may use one or more supercapacitors to store electrical power for use.

The AMD 104 may include several subsystems, such as an application subsystem 108, a mast subsystem 110, a mobility subsystem 112, a drive subsystem 114, and so forth. In other implementations, other arrangements of subsystems may be present. These subsystems may be powered by the battery(s) 106.

The application subsystem 108 includes one or more hardware processors (processors) 116. The processors 116 may comprise one or more cores. The processors 116 may include microcontrollers, systems on a chip, field programmable gate arrays, digital signal processors, graphic processing units, general processing units, and so forth. One or more clocks may provide information indicative of date, time, ticks, and so forth.

The AMD 104 may include one or more communication interfaces such as input/output (I/O) interfaces, network interfaces 118, and so forth. The communication interfaces enable the AMD 104, or components thereof, to communicate with other devices or components. The I/O interfaces may comprise Inter-Integrated Circuit (I2C), Serial Peripheral Interface bus (SPI), Universal Serial Bus (USB) as promulgated by the USB Implementers Forum, RS-212, and so forth.

The network interfaces 118 may be configured to provide communications between the AMD 104 and other devices such as other AMDs 104, a docking station, routers, access points, and so forth. The network interfaces 118 may include devices configured to couple to personal area networks (PANs), local area networks (LANs), wireless local area networks (WLANS), wide area networks (WANs), and so forth. For example, the network interfaces 118 may include devices compatible with Ethernet, Wi-Fi, Bluetooth, Bluetooth Low Energy, ZigBee, and so forth.

The I/O interface(s) may couple to one or more I/O devices 120. The I/O devices 120 may include input devices such as one or more sensors 122. The I/O devices 120 may also include output devices 124 such as one or more of a motor, light, speaker, display, projector, printer, and so forth. In some embodiments, the I/O devices 120 may be physically incorporated with the AMD 104 or may be externally placed. Network interfaces 118, sensors 122, and output devices 124 are discussed in more detail below with regard to FIG. 3.

The AMD 104 may also include one or more busses or other internal communications hardware or software that allow for the transfer of data between the various modules and components of the AMD 104.

The application subsystem 108 of the AMD 104 includes one or more memories 126. The memory 126 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 126 provides storage of computer-readable instructions, data structures, program modules, and other data for the operation of the AMD 104. A few modules are shown stored in the memory 126, although the same functionality may alternatively be implemented in hardware, firmware, or as a system on a chip (SoC).

The memory 126 may store instructions, such as one or more task modules 128, that may be executed at least in part by the one or more processors 116. For example, the task modules 128 may comprise applications that perform various function such as placing a video call, following the user as they move, playing audio content, presenting video content, and so forth. Additional modules that may be stored within the memory 126 are discussed below with regard to FIG. 2. For example, the memory 126 may store, and the processor 116 may execute, a speech processing module that allows the user to provide verbal comments to the AMD 104.

In some implementations the AMD 104 may include a mast subsystem 110. The mast subsystem 110 may include an extensible mast that supports one or more I/O devices 120. For example, the mast may provide physical support for one or more cameras, microphones, speakers, lights, image projectors, and so forth. In some implementations the movement of the mast or other devices associated with the mast may be included as outputs. For example, extension and retraction of the mast may be used to provide a particular output indicator to the user.

The mobility subsystem 112 includes one or more processors 116. These may be of the same type as the processors 116 used in other subsystems or they may differ. The processors 116 may comprise one or more cores. The processors 116 may include microcontrollers, systems on a chip, field programmable gate arrays, digital signals processors, graphic processing units, general processing units, and so forth. One or more clocks may provide information indicative of date, time, ticks, and so forth. The mobility subsystem 112 may also comprise one or more memories 126 comprising CRSM. In some implementations, the memory 126 may be the same as, or may differ from, the memory 126 of the application subsystem 108.

The mobility subsystem 112 may include one or more I/O devices 120. For example, the mobility subsystem 112 may include sensors 122 used to detect or avoid collision with an object.

The mobility subsystem 112 may include an autonomous navigation module 130. The autonomous navigation module 130 may be implemented as one or more of dedicated hardware, instructions stored in the memory 126 and executed on one or more processors 116, as instructions executed on an external device such as a server that is accessed via the network interfaces 118, and so forth. The autonomous navigation module 130 may be configured to move the AMD 104. In some situations, the movement may be responsive to instructions directing movement of the AMD 104 that are associated with a particular task. For example, the user may issue a request to the AMD 104 for the AMD 104 to follow the user. The request may be processed by the application subsystem 108 that sends instructions to the mobility subsystem 112 that directs the AMD 104 to follow the user.

The autonomous navigation module 130 of the mobility subsystem 112 may use sensor data from the one or more sensors 122 to find the user in the environment, determine a path to move the AMD 104, determine obstacles 102 to be avoided, and so forth. The mobility subsystem 112 determines where and how the AMD 104 is to be moved and provides instructions to the drive subsystem 114.

The drive subsystem 114 receives the instructions from the mobility subsystem 112 and proceeds to operate one or more motors 134. The drive subsystem 114 may include one or more processors 116, I/O devices 120, memory 126 (not shown), a motor control circuit 132, one or more motors 134, and an active braking circuit 136.

During normal operation, when no stop condition is present, the motor control circuit 132 provides power to drive one or more motors 134. For example, the motor control circuit 132 may use a motor driver to deliver a particular voltage, provide a particular pulse pattern of power, deliver power to particular windings of the motor 134 at particular times, and so forth. During normal operation, the AMD 104 may be stopped by commanding the motor control circuit 132 to cease providing power to the motor 134.

The drive subsystem 114 receives status signal(s) 138 from one or more subsystems such as the application subsystem 108, the mast subsystem 110, the mobility subsystem 112, the drive subsystem 114 itself, or other subsystems. The status signal 138 may be indicative of a stop condition. For example, if the status signal 138 transitions from a "high" value (above a threshold voltage) to a "low" value (below the threshold voltage), the status signal 138 may be indicative of a stop condition.

The stop condition may result from the autonomous navigation module 130 determining an expected collision of the AMD 104 with an obstacle 102, sensors 122 determining an actual collision of the AMD 104 with an object, the application subsystem 108 indicating receipt of a command to rapidly stop movement of the AMD 104, failure of one or more components of the AMD 104, and so forth. In one implementation, if any of the status signals 138 are indicative of a stop condition, the active braking circuit 136 may operate. Other stop conditions may also be determined, such as rotation of a wheel being less than a threshold value. Continuing the earlier example, a collision sensor may provide a status signal 138 that is a high value during normal operation, but transition to a low value in the event an obstacle 102 is detected within a threshold distance D1. A determination as to whether a signal is "high" or "low" may be made with respect to a threshold voltage. For example, a "high" signal has a voltage that is greater than the threshold voltage, while a "low" signal has a voltage that is less than the threshold voltage.

Utilization of the active braking circuit 136 may be responsive to one or more conditions. For example, the motor control circuit 132 may be used for typical or normal braking. However, if the AMD 104, the motor control circuit 132, or other braking systems are deemed to be unable to stop the AMD 104 within the distance D1 to the obstacle 102, the active braking circuit 136 may be used.

The active braking circuit 136 is described in more detail with regard to FIGS. 5A-5E and FIG. 6.

The drive subsystem 114 or other subsystems may determine a stop condition of the AMD 104. The stop condition may be indicative of one or more of: expected collision of the robot with an object, collision of the robot with an object, receipt of a command to stop movement of the AMD 104, or failure of one or more components of the AMD 104.

Motor position data is determined that is indicative of a position of at least a portion of a motor 134 of the AMD 104 that is rotating in a first direction. For example, the portion of the motor may comprise a rotor of the motor. Based on the stop condition and the motor position data, a first motor driver input is determined. The first motor driver input is used to cause a motor driver to drive the motor 134 in a second direction that is opposite the first direction.

In some implementations, the first motor driver input may be based at least in part on a pulse width modulation rate from pulse width modulation circuitry. A distance to an obstacle 102 may be determined. For example, an ultrasonic sensor 318, optical sensor 320, LIDAR 322, camera 344, or other sensor 122 may be used to determine the distance to the obstacle 102. The pulse width modulation rate may be determined based on the distance.

The PWM circuitry produces a PWM signal as output. The PWM signal controls a rate at which the motor 134 stops. For example, the greater the duty cycle of the PWM signal the faster the motor 134 will stop. In some implementations the PWM circuitry may be operated responsive to information, such as distance to an obstacle 102, speed of the AMD 104, and so forth. For example, the PWM signal may be proportionate to the distance to the obstacle 102, so as the distance to the obstacle 102 decreases, the duty cycle of the PWM signal increases.

The various subsystems may be physically located on separate circuit boards. For example, each subsystem may comprise components that share a common rigid or flexible printed circuit board. In some implementations, the motor control circuit 132, and the active braking circuit 136, may be arranged on the same circuit board. Such placement may improve reliability of the system by removing one or more connectors that could potentially fail.

Each subsystem may have dedicated one or more I/O devices 120. For example, the application subsystem 108 may include cameras, microphones, and so forth while the mobility subsystem 112 may include a LIDAR system, ultrasonic sensors, contact sensors, and so forth.

Communication between the subsystems may utilize various technologies including, but not limited to, Ethernet, universal serial bus (USB), and so forth. For example, the application subsystem 108 may communicate with the mobility subsystem 112 using a USB connection.

In some implementations, other communication paths, protocols, and so forth, may be used. For example, the application subsystem 108 may provide an interrupt pulse along a conductor that is connected to the mobility subsystem 112. This interrupt pulse may be used to indicate when one of the subsystems is performing an operation that may affect the operation of the other subsystems at a specific time. Continuing the example, the application subsystem

108 may use a sensor 122 that uses an illuminator that interferes with a sensor 122 used by the mobility subsystem 112. By providing the interrupt pulse, the application subsystem 108 may notify the mobility subsystem 112 as to the illumination, allowing the mobility subsystem 112 to disregard the potentially erroneous data from that sensor 122 during the time associated with the interrupt pulse. This technique allows the two subsystems to operate in conjunction with one another, without the need to maintain synchronized timing between the subsystems. By removing the need for synchronized timing, operation of the AMD 104 is simplified. In other implementations, other interrupt lines may be used to provide data indicative of a particular event or occurrence from one subsystem to another.

The lines used to provide the status signals 138 may be provided using dedicated lines. For example, each subsystem may have a dedicated electrical conductor to the drive subsystem 114 that provides the status signal(s) 138 from that subsystem.

The AMD 104 may use the network interfaces 118 to connect to a network 140. For example, the network 140 may comprise a wireless local area network, that in turn is connected to a wide area network such as the Internet. The AMD 104 may access one or more servers 142 via the network 140. For example, the AMD 104 may utilize a wakeword detection module to determine if the user is addressing a request to the AMD 104. The wakeword detection module may hear a specified word or phrase, transition the AMD 104 or portion thereof to a particular operating mode. Once "awake", the AMD 104 may then transfer at least a portion of the audio spoken by the user to the servers 142 for further processing. The servers 142 may process the spoken audio and return to the AMD 104 data that may be subsequently used to operate the AMD 104.

In some implementations, the speech processing for particular words or phrases may be handled locally. For example, if the user says "robot, stop" the speech processing module of the AMD 104 may recognize the command to "stop" and generate a signal indicative of a stop condition. As a result, the active braking circuit 136 described herein may be activated.

The AMD 104 may be configured to dock or connect to a docking station 144. The docking station 144 may also be connected to the network 140. For example, the docking station 144 may be configured to connect to the wireless local area network such that the docking station 144 and the AMD 104 may communicate. The docking station 144 may provide other functionality, such as recharging the battery 106.

In other implementations, other types of an autonomous mobile device (AMD) may use the systems and techniques described herein. For example, an AMD may comprise an autonomous ground vehicle that is moving on a street, an autonomous aerial vehicle in the air, and so forth.

Figure 2:
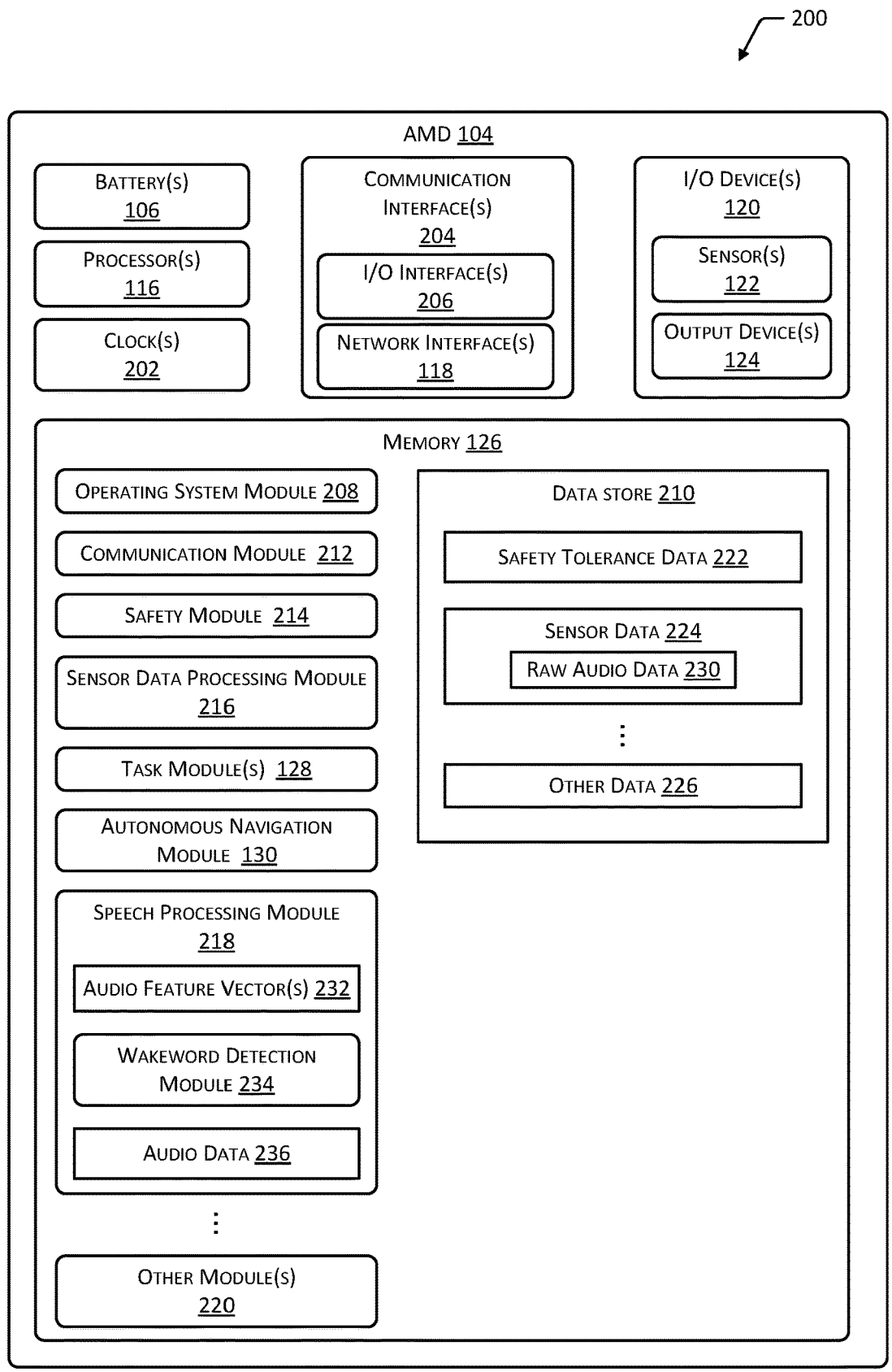
FIG. 2 is a block diagram of the components of the AMD, according to some implementations.

FIG. 2 is a block diagram 200 of the AMD 104, according to some implementations. For ease of illustration, and not necessarily as a limitation, the overall system is shown without demarcation into the various subsystems.

The AMD 104 may include one or more batteries 106 or other power source to provide electrical power suitable for operating the components in the AMD 104. The power source may include batteries, capacitors, fuel cells, storage flywheels, wireless power receivers, and so forth.

The AMD 104 may include one or more hardware processor 116 (processors) configured to execute one or more stored instructions. The processor 116 may comprise one or more cores. The processor 116 may include microcontrollers, systems on a chip, field programmable gate arrays, digital signals processors, graphic processing units, general processing units, and so forth. One or more clocks 202 may provide information indicative of date, time, ticks, and so forth. For example, the processor 116 may use data from the clock 202 to associate a particular interaction with a particular point in time.

The AMD 104 may include one or more communication interfaces 204 such as input/output (I/O) interfaces 206, network interfaces 118, and so forth. The communication interfaces 204 enable the AMD 104, or components thereof, to communicate with other devices or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 120. The I/O devices 120 may include input devices such as one or more of a sensor 122, keyboard, mouse, scanner, and so forth. The I/O devices 120 may also include output devices 124 such as one or more of a motor 134, light, speaker, display, projector, printer, and so forth. In some embodiments, the I/O devices 120 may be physically incorporated with the AMD 104 or may be externally placed.

The network interfaces 118 may be configured to provide communications between the AMD 104 and other devices such as other AMDs 104, the docking station 144, routers, access points, and so forth. The network interfaces 118 may include devices configured to couple to personal area networks (PANs), local area networks (LANs), wireless local area networks (WLANS), wide area networks (WANs), and so forth. For example, the network interfaces 118 may include devices compatible with Ethernet, Wi-Fi, Bluetooth, Bluetooth Low Energy, ZigBee, and so forth.

The AMD 104 may also include one or more busses or other internal communications hardware or software that allow for the transfer of data between the various modules and components of the AMD 104.

As shown in FIG. 2, the AMD 104 includes one or more memories 126. The memory 126 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 126 provides storage of computer-readable instructions, data structures, program modules, and other data for the operation of the AMD 104. A few example functional modules are shown stored in the memory 126, although the same functionality may alternatively be implemented in hardware, firmware, or as a system on a chip (SoC).

The memory 126 may include at least one operating system (OS) module 208. The OS module 208 is configured to manage hardware resource devices such as the I/O interfaces 206, the I/O devices 120, the communication interfaces 204, and provide various services to applications or modules executing on the processor 116. The OS module 208 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; the AMD Operating System (ROS) as promulgated at www.ros.org, and so forth.

Also stored in the memory 126 may be a data store 210 and one or more of the following modules. These modules may be executed as foreground applications, background tasks, daemons, and so forth. The data store 210 may use a flat file, database, linked list, tree, executable code, script, or other data structure to store information. In some implementations, the data store 210 or a portion of the data store 210 may be distributed across one or more other devices including other AMDs 104, servers, network attached storage devices, and so forth.

A communication module 212 may be configured to establish communication with other devices, such as other AMDs 104, an external server 142, a docking station 144, and so forth. The communications may be authenticated, encrypted, and so forth.

Other modules within the memory 126 may include a safety module 214, a sensor data processing module 216, an autonomous navigation module 130, the one or more task modules 128, a speech processing module 218, or other modules 220. The modules may access data stored within the data store 210, such as safety tolerance data 222, sensor data 224, or other data 226.

The safety module 214 may access safety tolerance data 222 to determine within what tolerances the AMD 104 may operate safely within the physical environment. For example, the safety module 214 may be configured to stop the AMD 104 from moving when a carrying handle is extended. In another example, the safety tolerance data 222 may specify a minimum sound threshold which, when exceeded, stops all movement of the AMD 104. Continuing this example, detection of sound such as a human yell would stop the AMD 104. In another example, the safety module 214 may access safety tolerance data 222 that specifies a minimum distance from an object that the AMD 104 may maintain. Continuing this example, when a sensor 122 detects an object has approached to less than the minimum distance, all movement of the AMD 104 may be stopped. Movement of the AMD 104 may be stopped by one or more of inhibiting operations of one or more of the motors 134, issuing a command to stop motor 134 operation, disconnecting power from one or more the motors 134, and so forth. The safety module 214 may be implemented as hardware, software, or a combination thereof. The safety module 214 may produce as output a status signal 138 that is used to control the active braking circuit 136.

The sensor data processing module 216 may access sensor data 224 that is acquired from one or more the sensors 122. The sensor data processing module 216 may provide various processing functions such as de-noising, filtering, change detection, and so forth. Processing of sensor data 224, such as images from a camera 344, may be performed by a module implementing, at least in part, one or more of the following tools or techniques. In one implementation, processing of the image data may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 224. In still another implementation, functions such as those in the Machine Vision Toolbox (MVTB) available using MATLAB as developed by Math Works, Inc. of Natick, Mass., USA, may be utilized.

Techniques such as artificial neural networks (ANNs), active appearance models (AAMs), active shape models (ASMs), principal component analysis (PCA), cascade classifiers, and so forth, may also be used to process the sensor data 224 or other data 226. For example, the ANN may be a trained using a supervised learning algorithm such that object identifiers are associated with images of particular objects within training images provided to the ANN. Once trained, the ANN may be provided with the sensor data 224 and produce output indicative of the object identifier.

The autonomous navigation module 130 provides the AMD 104 with the ability to navigate within the physical environment without real-time human interaction. For example, the autonomous navigation module 130 may implement one or more simultaneous localization and mapping ("SLAM") techniques to determine an occupancy map or other representation of the physical environment. The SLAM algorithms may utilize one or more of maps, algorithms, beacons, or other techniques to provide navigational data. The navigational data may then be used to determine a path which is then subsequently used to determine a set of commands that drive the motors 134 connected to the wheels of the AMD 104. For example, the autonomous navigation module 130 may access environment map data during operation to determine relative location, estimate a path to a destination, and so forth.

The autonomous navigation module 130 may include an obstacle avoidance module. For example, if an obstacle 102 is detected along a planned route, the obstacle avoidance module may re-route the AMD 104 to move around the obstacle 102 or take an alternate route. The autonomous navigation module 130 may produce as output a status signal 138 that is used to control the active braking circuit 136. For example, if the autonomous navigation module 130 detects an imminent or actual collision with an object, the status signal 138 may be provided that operates the circuitry of the active braking circuit 136.

The autonomous navigation module 130 may utilize various techniques during processing of sensor data 224. For example, image data obtained from cameras may be processed to determine one or more of corners, edges, planes, and so forth. In some implementations, corners may be detected and the coordinates of those corners may be used to produce point cloud data.

The occupancy map may be manually or automatically determined. Continuing the example, during the learning phase, or subsequent operation, the AMD 104 may generate an occupancy map that is indicative of locations of obstacles 102 such as chairs, doors, stairwells, and so forth.

In some implementations, the occupancy map may include floor characterization data. The floor characterization data is indicative of one or more attributes of the floor at a particular location within the physical environment. During operation of the AMD 104, floor characterization data may be obtained. The floor characterization data may be utilized by one or more of safety module 214, the autonomous navigation module 130, the task module 128, or other modules 220. For example, the floor characterization data may be used to determine if an unsafe condition occurs such as a wet floor. In another example, the floor characterization data may be used by the autonomous navigation module 130 to assist in the determination of the current location of the AMD 104 within the home.

The memory 126 may store one or more task modules 128. A task module 128 comprises instructions that, when executed, provide one or more functions associated with a particular task. In one example, the task may comprise a security or watchmen task in which the AMD 104 travels throughout the physical environment looking for events that exceed predetermined thresholds. Continuing the example, if the AMD 104 detects that the ambient temperature is below a minimum level, or that water is present on the floor, or detects sound of broken glass, an alert may be generated. The alert may be given as an audible, visual, or electronic notification. For example, the electronic notification may involve the AMD 104 transmitting data using one or more the communication interfaces 204.

In another example, the task may comprise a "follow me" feature in which the AMD 104 follows a user. For example, the user may participate in a video call using the AMD 104. The camera on the mast may be used to acquire video for transmission while the display is used to present video that is received. The AMD 104 may use data from one or more sensors 122 to determine a location of the user relative to the AMD 104, and track and follow the user. In one implementation, computer vision techniques may be used to locate the user within image data acquired by the cameras. In another implementation, the user's voice may be detected by an array of microphones, and a direction to the voice with respect to the AMD 104 may be established. Other techniques may be utilized either alone or in combination to allow the AMD 104 to track a user, follow a user, or track and follow a user. The path of the AMD 104 as it follows the user may be based at least in part on one or more cost values. For example, while the AMD 104 is following the user down the hallway, the AMD 104 may stay to the right side of the hallway. In some situations, while following a user the AMD 104 may disregard some rules or may disregard the speed values for a particular area. For example, while following the user the AMD 104 may not slow down while passing a doorway.

In yet another example, the task may allow for the AMD 104 to be summoned to a particular location. The user may utter a voice command that is heard by a microphone on the AMD 104, a microphone in a smart phone, or another device with a microphone such as a network enabled speaker or television. Alternatively, the user may issue a command using an app on a smartphone, wearable device, tablet, or other computing device. Given that the location of the device at which the command was obtained is known, the AMD 104 may be dispatched to that location. Alternatively, if the location is unknown, the AMD 104 may search for the user.

The speech processing module 218 may be used to process utterances of the user. Microphones may acquire audio in the presence of the AMD 104 and may send raw audio data 230 to an acoustic front end (AFE). The AFE may transform the raw audio data 230 (for example, a single-channel, 16-bit audio stream sampled at 16 kHz), captured by the microphone, into audio feature vectors 232 that may ultimately be used for processing by various components, such as a wakeword detection module 234, speech recognition engine, or other components. The AFE may reduce noise in the raw audio data 230. The AFE may also perform acoustic echo cancellation (AEC) or other operations to account for output audio data that may be sent to a speaker of the AMD 104 for output. For example, the AMD 104 may be playing music or other audio that is being received from a network 140 in the form of output audio data. To avoid the output audio interfering with the device's ability to detect and process input audio, the AFE or other component may perform echo cancellation to remove the output audio data from the input raw audio data 230, or other operations.

The AFE may divide the audio data 236 into frames representing time intervals for which the AFE determines a number of values (i.e., features) representing qualities of the raw audio data 230, along with a set of those values (i.e., a feature vector or audio feature vector 232) representing features/qualities of the raw audio data 230 within each frame. A frame may be a certain period of time, for example a sliding window of 25 ms of audio data 236 taken every 10 ms, or the like. Many different features may be determined, as known in the art, and each feature represents some quality of the audio that may be useful for automated speech recognition (ASR) processing, wakeword detection, presence detection, or other operations. A number of approaches may be used by the AFE to process the raw audio data 230, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 232 (or the raw audio data 230) may be input into a wakeword detection module 234 that is configured to detect keywords spoken in the audio. The wakeword detection module 234 may use various techniques to determine whether audio data 236 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 234 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio (or audio data 236) is analyzed to determine if specific characteristics of the audio match preconfigured acoustic waveforms, audio signatures, or other data to determine if the incoming audio "matches" stored audio data 236 corresponding to a keyword.

Thus, the wakeword detection module 234 may compare audio data 236 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 236 (which may include one or more audio feature vectors 232 or the raw audio data 230) to one or more server(s) 142 for speech processing. The audio data 236 corresponding to audio obtained by the microphone may be sent to a server 142 for routing to a recipient device or may be sent to the server 142 for speech processing for interpretation of the included speech (either for purposes of enabling voice-communications and/or for purposes of executing a command in the speech). The audio data 236 may include data corresponding to the wakeword, or the portion of the audio data 236 corresponding to the wakeword may be removed by the local AMD 104 prior to sending.

In some implementations, a particular wakeword or phrase may be associated with a stop condition. For example, the phrase "emergency stop" may be a wakeword that results in the application subsystem 108 producing a status signal 138 indicative of stop conditions. As a result, the use of this phrase may result in the AMD 104 operating the active braking circuit 136.

The AMD 104 may connect to the network 140 using one or more of the network interfaces 118. One or more servers 142 may provide various functions, such as ASR, natural language understanding (NLU), providing content such as audio or video to the AMD 104, and so forth.

The other modules 220 may provide other functionality, such as object recognition, speech synthesis, user identification, and so forth. For example, an ASR module may accept as input raw audio data 230 or audio feature vectors 232 and may produce as output a text string that is further processed and used to provide input, a task module 128, and so forth. In one implementation, the text string may be sent via a network 140 to a server 142 for further processing. The AMD 104 may receive a response from the server 142 and present output, perform an action, and so forth. For example, the raw audio data 230 may include the user saying "robot, go to the dining room". The audio data 236 representative of this utterance may be sent to the server 142 that returns commands directing the AMD 104 to the dining room of the home associated with the AMD 104.

The utterance may result in a response from the server 142 that directs operation of other devices or services. For example, the user may say "robot wake me at seven tomorrow morning". The audio data 236 may be sent to the server 142 that determines the intent and generates commands to instruct a device attached to the network 140 to play an alarm at 7:00 am the next day.

The other modules 220 may comprise a speech synthesis module that is able to convert text data to human speech. For example, the speech synthesis module may be used by the AMD 104 to provide speech that a user is able to understand.

The data store 210 may also store other data 226 such as user identifier data that is indicative of the user identifier of a user associated with the AMD 104. For example, one or more of the raw audio data 230 or the audio feature vectors 232 may be processed to determine the user identifier data of a user based on the sound of the user's voice. In another implementation an image of the user may be acquired using one or more cameras and processed using a facial recognition system to determine the user identifier data.

The data store 210 may store other data 226 such as user preference data.

Figure 3:
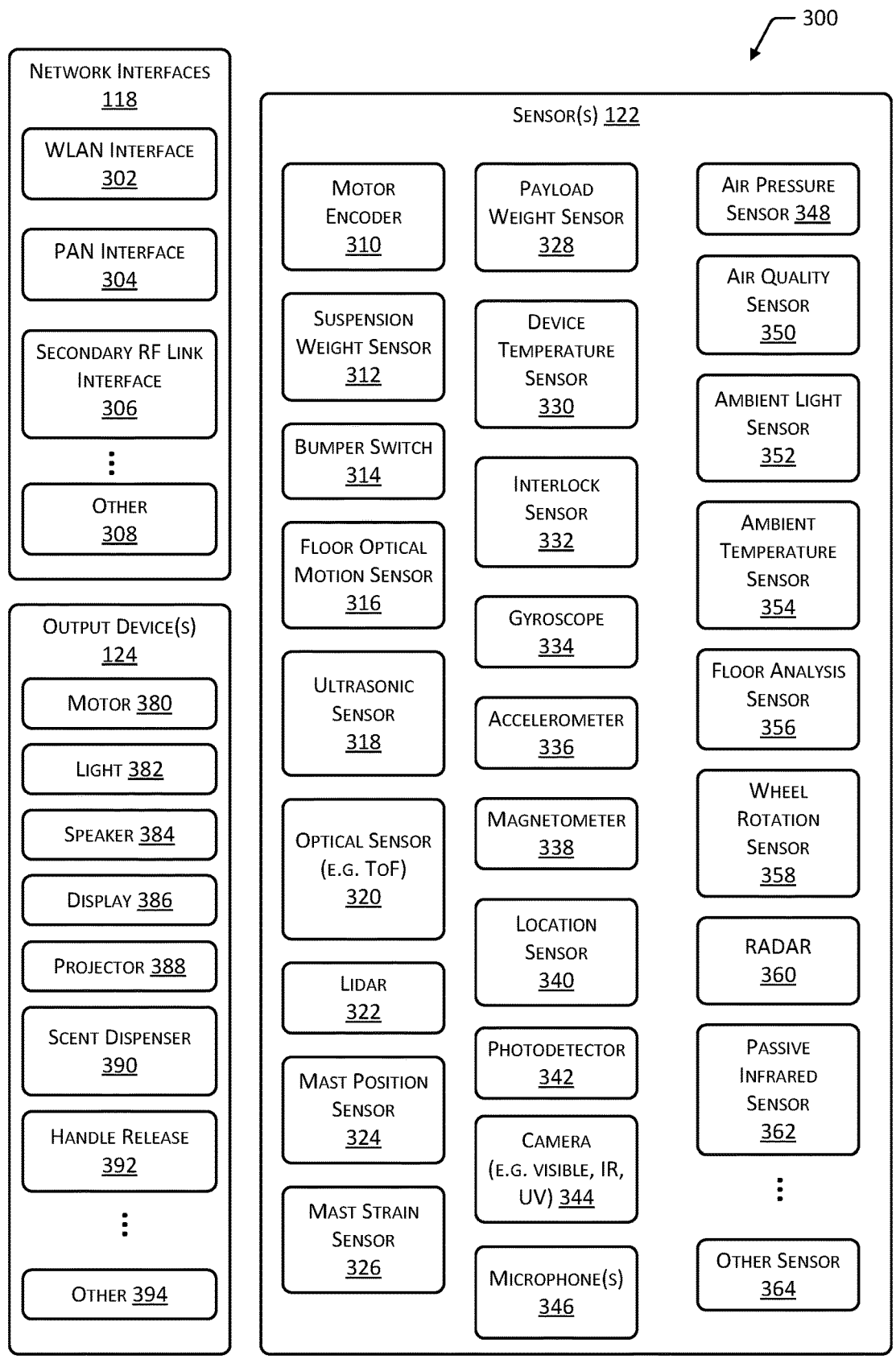
FIG. 3 is a block diagram of some components of the AMD such as network interfaces, sensors, and output devices, according to some implementations.

FIG. 3 is a block diagram 300 of some components of the AMD 104 such as network interfaces 118, sensors 122, and output devices 124, according to some implementations. The components illustrated here are provided by way of illustration and not necessarily as a limitation. For example, the AMD 104 may utilize a subset of the particular network interfaces 118, output devices 124, or sensors 122 depicted here, or may utilize components not pictured.

The network interfaces 118 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with the least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices in the event that communication fails using one or more of the WLAN interface 302 or the PAN interface 304. For example, in the event the AMD 104 travels to an area within the physical environment that does not have Wi-Fi coverage, the AMD 104 may use the secondary RF link interface 306 to communicate with another device such as a specialized access point, docking station 144, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 3G, 4G, LTE, or other standards.

The AMD 104 may include one or more of the following sensors 122. The sensors 122 depicted here are provided by way of illustration and not necessarily as a limitation. It is understood other sensors 122 may be included or utilized by the AMD 104, while some sensors 122 may be omitted in some configurations.

A motor encoder 310 provides information indicative of the rotation or linear extension of a motor 134. The motor 134 may comprise a rotary motor, or a linear actuator. In some implementations, the motor encoder 310 may comprise a separate assembly such as a photodiode and encoder wheel that is affixed to the motor 134. In other implementations, the motor encoder 310 may comprise circuitry configured to drive the motor 134. For example, the autonomous navigation module 130 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 214 may use data from the suspension weight sensor 312 to determine whether or not to inhibit operation of one or more of the motors 134. For example, if the suspension weight sensor 312 indicates no weight on the suspension, the implication is that the AMD 104 is no longer resting on its wheels, and thus operation of the motors 134 may be inhibited. In another example, if the suspension weight sensor 312 indicates weight that exceeds a threshold value, the implication is that something heavy is resting on the AMD 104 and thus operation of the motors 134 may be inhibited.

One or more bumper switches 314 provide an indication of physical contact between a bumper or other member that is in mechanical contact with the bumper switch 314. The safety module 214 may utilize sensor data 224 obtained by the bumper switches 314 to modify the operation of the AMD 104. For example, if the bumper switch 314 associated with a front of the AMD 104 is triggered, the safety module 214 may drive the AMD 104 backwards.

A floor optical motion sensor (FOMS) 316 provides information indicative of motions of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data.

An ultrasonic sensor 318 may utilize sounds in excess of 20 kHz to determine a distance from the sensor 122 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 224 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field of view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. A portion of the structured light pattern may then be detected on the object using a sensor 122 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 214 and the autonomous navigation module 130 may utilize the sensor data 224 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 224 may be generated that is indicative of the presence of objects and the relative positions, shapes, and so forth are visible to the lidar 322. Data from the lidar 322 may be used by various modules. For example, the autonomous navigation module 130 may utilize point cloud data generated by the lidar 322 for localization of the AMD 104 within the physical environment.

A mast position sensor 324 provides information indicative of a position of the mast. For example, the mast position sensor 324 may comprise limit switches associated with the mast extension mechanism that indicate whether the mast is in an extended or retracted position. In other implementations, the mast position sensor 324 may comprise an optical code on at least a portion of the mast that is then interrogated by an optical emitter and a photodetector to determine the distance to which the mast is extended. In another implementation, the mast position sensor 324 may comprise an encoder wheel that is attached to a mast motor that is used to raise or lower the mast. The mast position sensor 324 may provide data to the safety module 214. For example, if the AMD 104 is preparing to deploy the carrying handle, data from the mast position sensor 324 may be checked to determine if the mast is retracted, and if not, the mast may be retracted prior to deployment of the carrying handle. By retracting the mast before the carrying handle is deployed, injury to the user as well as damage to the mast is avoided as the user bends down to grasp the carrying handle.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 214 may utilize sensor data 224 obtained by the mast strain sensor 326. For example, if the strain applied to the mast exceeds a threshold amount, the safety module 214 may direct an audible and visible alarm to be presented by the AMD 104.

A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 214 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 106, one or more motors 134, and so forth. In the event the temperature exceeds a threshold value, the component associated with that device temperature sensor 330 may be shut down.

One or more interlock sensors 332 may provide data to the safety module 214 or other circuitry that prevents the AMD 104 from operating in an unsafe condition. For example, the interlock sensors 332 may comprise switches that indicate whether an access panel is open, if the carrying handle is deployed, and so forth. The interlock sensors 332 may be configured to inhibit operation of the AMD 104 until the interlock switch indicates a safe condition is present.

A gyroscope 334 may provide information indicative of rotation of an object affixed thereto. For example, the gyroscope 334 may generate sensor data 224 that is indicative of a change in orientation of the AMD 104 or portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 224 indicative of impinging light. For example, the photodetector 342 may provide data indicative of a color, intensity, duration, and so forth.

A camera 344 generates sensor data 224 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 224 comprising images being sent to the autonomous navigation module 130. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 130 may be acquired using a rolling shutter and subsequently may be processed to mitigate image artifacts.

One or more microphones 346 may be configured to acquire information indicative of sound present in the physical environment. In some implementations, arrays of microphones 346 may be used. These arrays may implement beamforming techniques to provide for directionality of gain. The AMD 104 may use the one or more microphones 346 to acquire information from acoustic tags, accept voice input from users, determine ambient noise level, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors or other light-sensitive elements that are used to determine one or more of the color, intensity, or duration of ambient lighting around the AMD 104.

An ambient temperature sensor 354 provides information indicative of the temperature of the ambient environment proximate to the AMD 104. In some implementations, an infrared temperature sensor may be utilized to determine the temperature of another object at a distance.

A floor analysis sensor 356 may include one or more components that are used to generate at least a portion of the floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 214, the autonomous navigation module 130, the task module 128, and so forth. For example, if the floor analysis sensor 356 determines that the floor is wet, the safety module 214 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A wheel rotation sensor 358 provides output that is indicative of rotation of a wheel, such as a drive wheel or caster wheel. For example, the wheel may include a magnet, while the wheel rotation sensor 358 comprises a Hall sensor or reed switch that is able to detect the magnetic field of the magnet. As the wheel rotates, the sensor detects the magnet moving past. Based on when the magnet is detected, a determination may be made about one or more of rotation rate of the wheel, whether the wheel is no longer rotating, and so forth. For example, if the wheel seizes and no longer rotates about its axle, there is the potential for the AMD 104 to drag the wheel along the floor, potentially damaging the floor, the wheel, or both. If the wheel rotation sensor 358 detects that the wheel is not rotating about its axle while the motors 134 are engaged to move the AMD 104, the status signal 138 may be produced that indicates a stop condition. As a result, the active braking circuit 136 may operate to stop the AMD 104.

In another implementation, the wheel rotation sensor 358 provides data indicative of one or more of a direction of orientation, angular velocity, linear speed of the wheel, and so forth. For example, if the wheel is a caster, the wheel rotation sensor 358 may comprise an optical encoder and corresponding target that is able to determine that the caster transitioned from an angle of 0° at a first time to 49° at a second time.

The sensors 122 may include a radar 360. The radar 360 may be used to provide information as to a distance, lateral position, and so forth, to an object.

The sensors 122 may include a passive infrared (PIR) sensor 362. The PIR sensor 362 may be used to detect the presence of people, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. In another example, the other sensors 364 may include humidity sensors to determine the humidity of the ambient air. Other sensors 364 may include radio frequency identification (RFID) readers, near field communication (NFC) systems, a coded aperture camera, and so forth. For example, NFC tags may be placed at various points within the physical environment to provide landmarks for the autonomous navigation module 130. One or more touch sensors may be utilized to determine contact with a user or other object.

The AMD 104 may include one or more output devices 124. A motor 380 may be used to provide linear or rotary motion. A light 382 may be used to emit photons. A speaker 384 may be used to emit sound. A display 386 may comprise one or more of a liquid crystal display, light emitting diode display, electrophoretic display, cholesterol display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 be used to emit one or more smells. For example, the scent dispenser 390 may comprise a plurality of different scented liquids that may be evaporated or vaporized in a controlled fashion to release predetermined amounts of each.

A handle release 392 may comprise an electrically operated mechanism such as one or more of a motor, solenoid, piezoelectric material, electroactive polymer, shape-memory alloy. In one implementation, the handle release 392 may release a latch that allows a spring to push the carrying handle into the deployed position. In another implementation, the electrically operated mechanism may provide the force that deploys the carrying handle. Retraction of the carrying handle may be manual or electronically activated.

In other implementations, other 394 output devices may be utilized. For example, the AMD 104 may include a haptic output device that provides output that produces particular touch sensations to the user. Continuing the example, a motor 380 with an eccentric weight may be used to create a buzz or vibration to allow the AMD 104 to simulate the purr of a cat.

Figure 4:
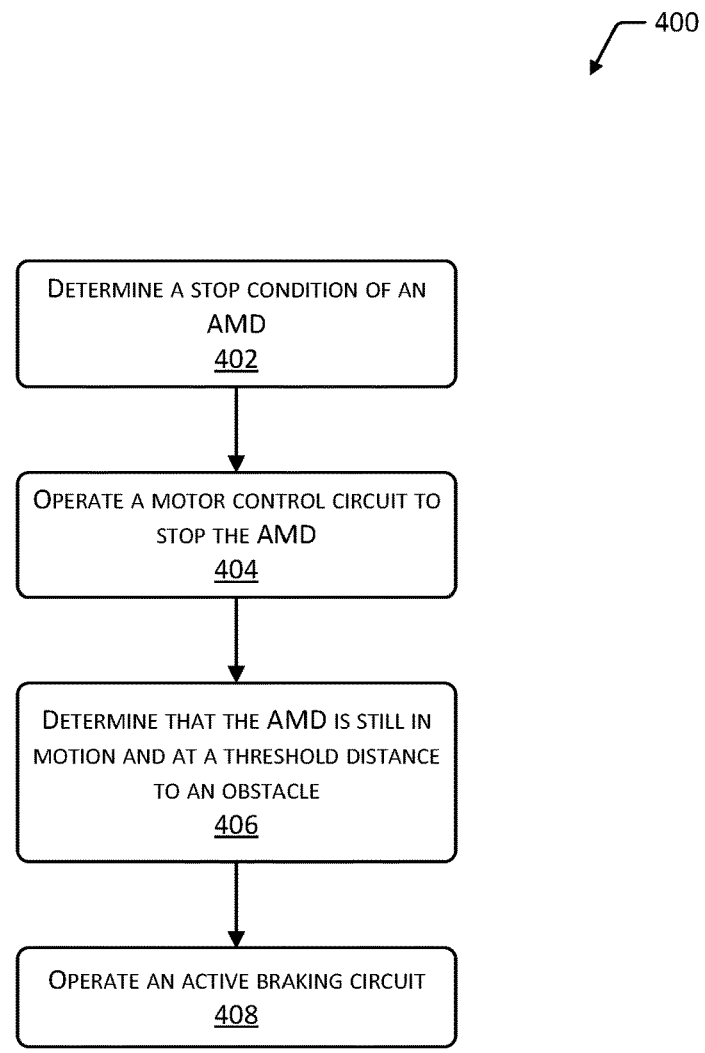
FIG. 4 is a flow diagram of a process to initiate active braking of the AMD, according to some implementations.

FIG. 4 is a flow diagram 400 of a process to rapidly brake the AMD 104, according to some implementations. The process may be implemented at least in part by the circuitry described in FIGS. 5A-5E. The process is described with respect to a single motor 134 for ease of discussion, and not necessarily as a limitation. For example, the process may be used with two or more motors 134.

At 402 a stop condition is determined. For example, the stop condition may result from one or more of a failure of one or more components of the device, expected collision of the device with an object, collision of the device with an object, receipt of a command to stop movement of the motor, and so forth. As a result of the stop condition, a status signal 138 may be produced. For example, the stop condition may be indicated by the status signal 138 transitioning from a high value (having a voltage above a threshold value) to a low value (in which the voltage is below the threshold value). The status signals 134 from a plurality of components, subsystems, and so forth, may be used as input to a multiple-input AND gate. If any one of the status signals 138 is in the low state, the output from the AND gate is also low, producing a stop signal.

At 404, the motor control circuit 132 is operated to disconnect the motor 134 from the power supply. For example, responsive to the stop signal, the motor control circuit 132 may cease providing signals to drive the motor 134. In another example, responsive to the stop signal, the motor control circuit 132 may short two or more terminals of the motor 134 through an electrical resistor.

At 406 a determination is made that the AMD 104 is still in motion and at a threshold distance to an obstacle 102. For example, one or more sensors 122 may provide information that the distance to the obstacle 102 is less than a threshold distance. In one implementation the threshold distance may comprise a maximum stopping distance plus an additional distance to provide an additional margin of safety. For example, if the AMD 104 may be stopped using the active braking circuit 136 in a distance of 30 cm, the threshold distance may be 40 cm.

At 408, the active braking circuit 136 is operated. Continuing the example, given the determination that the AMD 104 has not been stopped due to the action(s) of the motor control circuit 132, the active braking circuit 136 is engaged. In some implementations other actions may also be taken. For example, if the active braking circuit 136 is unable to stop the AMD 104, power to one or more of the motors 134 may be discontinued, an alarm sound may be presented, the direction of the AMD 104 may be changed, and so forth.

FIGS. 5A-5E are a schematic of an active braking circuit 136 and associated circuitry, according to some implementations. The active braking circuit 136 may be implemented as one or more of discrete components, complex programmable logic devices (CPLDs), field programmable gate arrays (FPGAs), application specific integrated circuits (ASICs), and so forth.

In some situations, the AMD 104 may move using two motors 134 arranged so they rotate in opposite directions. For example, the AMD 104 may have a first motor 134 on a right side and a second motor 134 on a left side. While moving forward the first motor 134 rotates clockwise (CW) while the second motor 134 rotates counterclockwise (CCW).

Figure 5A:
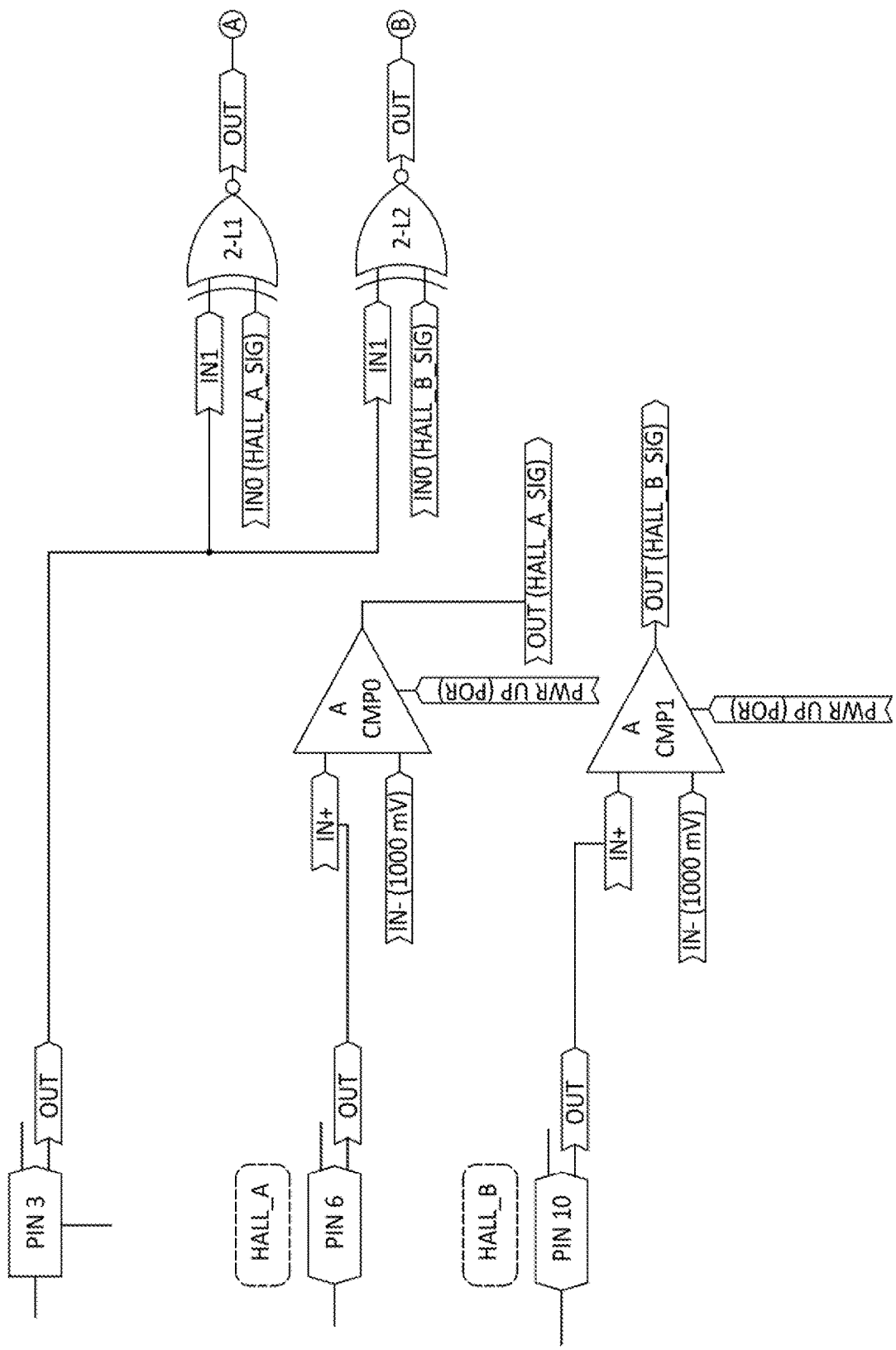
FIGS. 5A-5E are a schematic of an active braking circuit and associated circuitry, according to some implementations.

FIG. 5A depicts a portion of the active braking circuit 136 that allows rotation selection for a portion of the active braking circuit 136 to operate on one of two motors that may rotate in opposite directions during the same motion, such as described above.

The terms "high" and "low" with respect to signals are used below for ease of illustration and not necessarily as a limitation. A designation of whether a signal is "high" or "low" may be made with respect to one or more threshold values. For example, the threshold value may be 1 Volt (V), and a signal with a voltage greater than 2 V may be designated as "high" while a signal with a voltage less than 1 V may be designated as low. With regard to binary values, a "0" may be designated as "low" while a "1" is designated as "high".

During operation the active braking circuit 136 provides commutation to rotate the motor 134 in the opposite direction. Continuing the earlier example, this would result in the active braking circuit 136 providing commutation consistent with CCW on the first motor 134 and CW commutation on the second motor 134.

In this illustration a first XNOR gate 2-L1, a second XNOR gate 2-L2, a first comparator CMP0, and a second comparator CMP1 are shown.

In this illustration, pin 3 may be connected to a select line used to select whether a portion of the active braking circuit 136 is to operate a motor 134 rotating in a first direction (such as CCW) or a second direction (such as CW). In the implementation depicted here, pin 3 is set low for CW commutation used to brake the right motor 134 or is set high for CCW commutation used to brake the left motor 134.

Figure 5B:
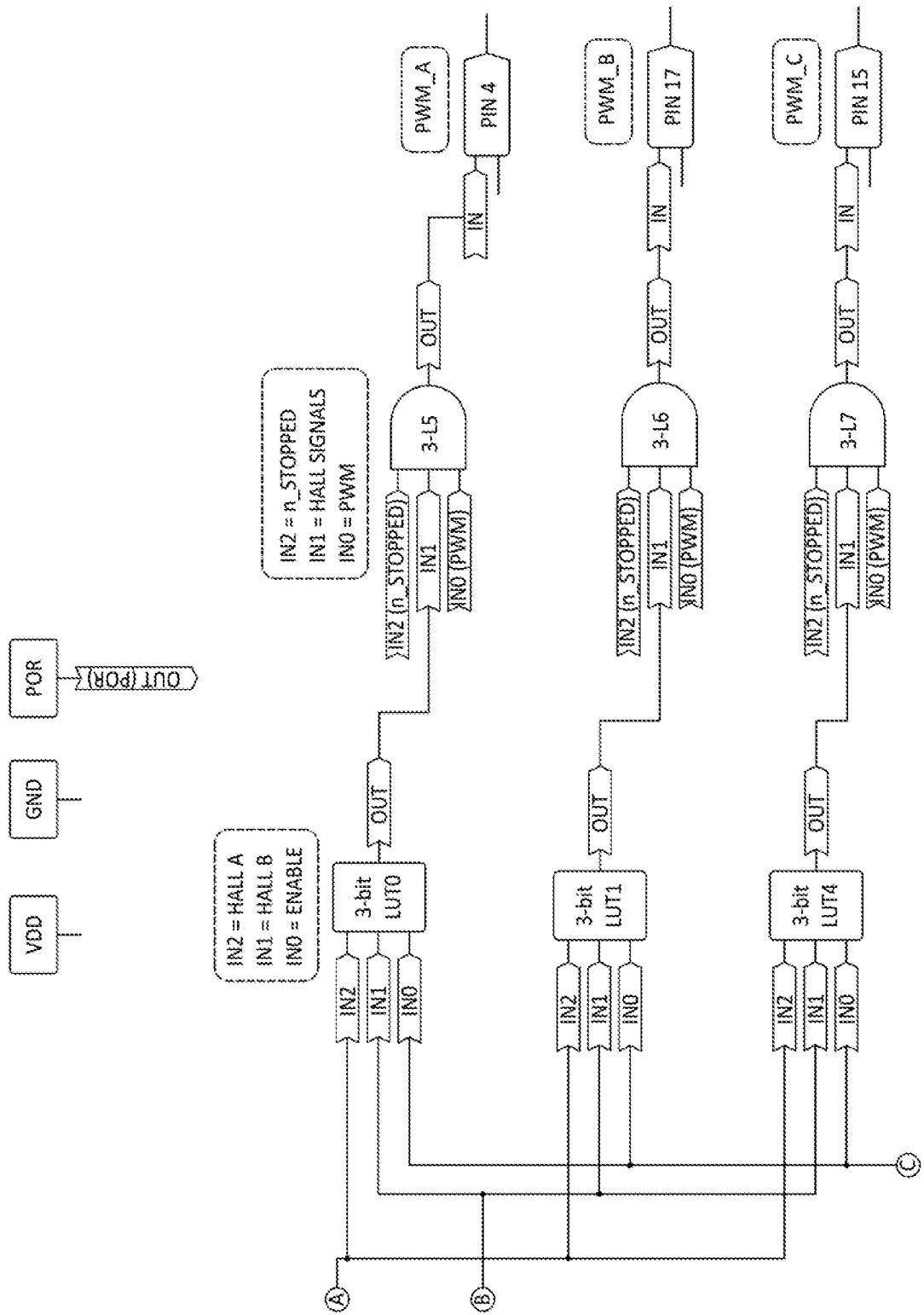

The first XNOR gate 2-L1 has a first input connected to pin 3 that is connected to the select line, a second input connected to a first comparator output of the first comparator CMP0, and a first output. The first output of the first XNOR gate 2-L1 is connected to a third input of a first LUT element, a third input of a second LUT element, and a third input of the a LUT element, as shown in FIG. 5B.

The second XNOR gate 2-L2 has a first input connected to pin 3 that is also connected to the select line, a second input connected to the second comparator output of the second comparator CMP1, and a first output. The first output of the second XNOR gate 2-L2 is connected to a second input of the first LUT element, a second input of the second LUT element, and a second input of the third LUT element.

The first comparator CMP0 has a first input connected to a reference voltage source, a second input connected to a first sensor of a motor 134, and the first comparator output. In one implementation, the first input may be connected to a −1 V reference voltage source. The sensor of the motor 134 provides motor position data that is indicative of a position of at least a portion of the motor 134. For example, the sensor may comprise a Hall sensor or Hall effect sensor that is in the stator of the motor and is used to detect position of a rotor of the motor, a Hall sensor elsewhere in the motor 134, an optical encoder, switches, or other devices. The motor position data may be indicative of the position of the same portion of the motor 134 or different portions of the motor 134. For example, the rotor may have a single magnet that is detected by the sensor. In another example, the rotor may have a plurality of magnets, which are detected by the sensor as they pass within range of the sensor. In other implementations, other techniques may be used to determine the motor position data.

A brushless direct current (BLDC) motor 134 may have three phases, each phase having a sensor to provide position information used to commutate the motor 134 during operation. In this example, the first input of the first comparator CMP0 is connected to the output of the Hall "A" sensor of the motor 134.

The second comparator CMP1 has a first input connected to the reference voltage source, a second input connected to a second sensor of the motor 134, and the second comparator output. In one implementation, the first input may be connected to the −1 V reference voltage source may also be used by the first comparator CMP0. In this example, the first input of the second comparator CMP0 is connected to the output of the Hall "B" sensor of the motor 134.

The first comparator CMP0 and the second comparator CMP1 may also have a power up or power on reset input, as shown here.

In situations where the BLDC uses three or more phases, the output from the other sensors may or may not be used. For example, in the circuit as illustrated, the output from a third Hall "C" sensor is not used. The output from the Hall "C" sensor could be used, which would result in a change in the output of the active braking circuit 136 as used to drive a motor driver and operate the motor 134.

In some situations, a single motor driver may be used to drive more than one motor 134. For example, a motor driver may have a first motor driver input that receives the signal from the active braking circuit 136. The motor driver may have a first motor driver output that is connected to a first terminal of a first motor 134, and a second motor driver output that is connected to a first terminal of a second motor 134. The first motor 134 and the second motor 134 may be synchronized. For example, the first motor 134 and the second motor 134 may be connected to a common shaft or may be electronically synchronized.

As continued in FIG. 5B, the active breaking circuit 136 may include one or more logic elements, such as a first logic element LUT0, a second logic element (LUT1), and a third logic element (LUT4). In one implementation, these logic elements may implement the respective lookup tables depicted in FIG. 6. In another implementation, a single logic element may be used. For example, the functionality described with respect to the first logic element, the second logic element, and the third logic element may be implemented as a single logic element incorporating a single lookup table.

Figure 5C:
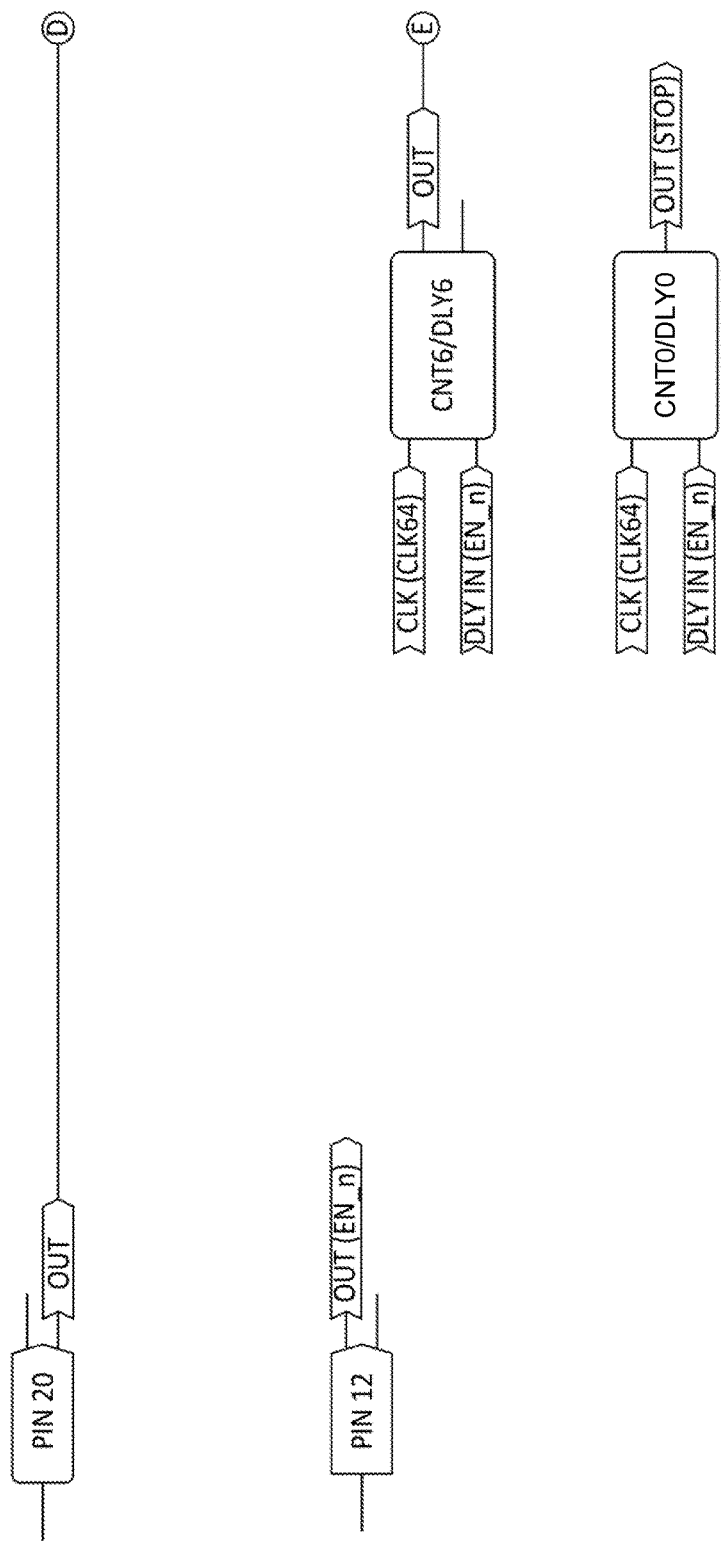

The first logic element LUT0 has a first input that is connected to a first counter output, a second input that is connected to the second comparator output, a third input that is connected to the first comparator output, and a first output. A first counter and the first counter output are depicted in FIG. 5C.

The second logic element LUT1 has a first input that is connected to the first counter output, a second input that is connected to the second comparator output, a third input that is connected to the first comparator output, and a first output.

The third logic element LUT4 has a first input that is connected to the first counter output, a second input that is connected to the second comparator output, a third input that is connected to the first comparator output, and a first output.

While three logic elements are depicted in FIG. 5B, it is understood that in other implementations fewer logic elements may be used. For example, the functionality of the first, second, and third logic elements may be combined into a single logic element.

A first AND gate 3-L5 has a first input connected to a PWM output, a second input connected to the first output of the first logic element, a third input connected to the second counter output, and a first output connected to a first motor driver input. For example, the PWM output may be provided by the circuitry described with respect to FIG. 5E. The first motor driver input may comprise an input to a motor driver that is used to provide output to drive a first phase of the motor 134.

A second AND gate 3-L6 has a first input connected to the PWM output, a second input connected to the second output of the second logic element, a third input connected to the second counter output, and a first output connected to a second motor driver input. The second motor driver input may comprise an input to a motor driver that is used to provide output to drive a second phase of the motor 134.

A third AND gate 3-L7 has a first input connected to the PWM output, a second input connected to the third output of the third logic element, a third input connected to the second counter output, and a first output connected to the third motor driver input. The third motor driver input may comprise an input to a motor driver that is used to provide output to drive a third phase of the motor 134.

FIG. 5C depicts pin 20 which may be used to initiate a test of the active braking circuit 136. For example, pin 20 may be used to override the stop signal from the second counter CNT0/DLY0 so the circuit otherwise remains operational.

Also shown is pin 12 which is connected to the enable line and is used to operate the active braking circuit 136. For example, the active braking circuit 136 may be enabled to operate when the enable line and thus pin 12 is set low.

A first counter CNT6/DLY6 is also shown. The first counter CNT6/DLY6 may use a 7.8125 kHz oscillator. The first counter CNT6/DLY6 may operate as a delay circuit that introduces a delay between the enable signal on the enable line operating the active braking circuit 136. For example, the first counter CNT6/DLY6 may provide an output 1 ms after receiving the enable signal. The first counter CNT6/DLY6 has a clock input connected to a clock source, an input connected to pin 12, and the first counter output. The first counter output may also be considered a delay output.

A second counter CNT0/DLY0 is also shown. The second counter CNT0/DLY0 may use a 7.8125 kHz oscillator. The second counter CNT0/DLY0 may be used to set a maximum time that the active braking circuit 136 is operative. The second counter CNT0/DLY0 has a clock input connected to a clock source, an input connected to pin 12, and the second counter output. For example, when the enable line indicates the active braking circuit 136 is to operate, the second counter CNT0/DLY0 operates to produce a stop signal after a certain interval of time. For example, the second counter CNT0/DLY0 may provide a high output and then go low after 512 ms. In some implementations, the duration of the time interval specified by the second counter CNT0/DLY0 may be set based on a maximum time needed to stop the AMD 104.

Figure 5D:
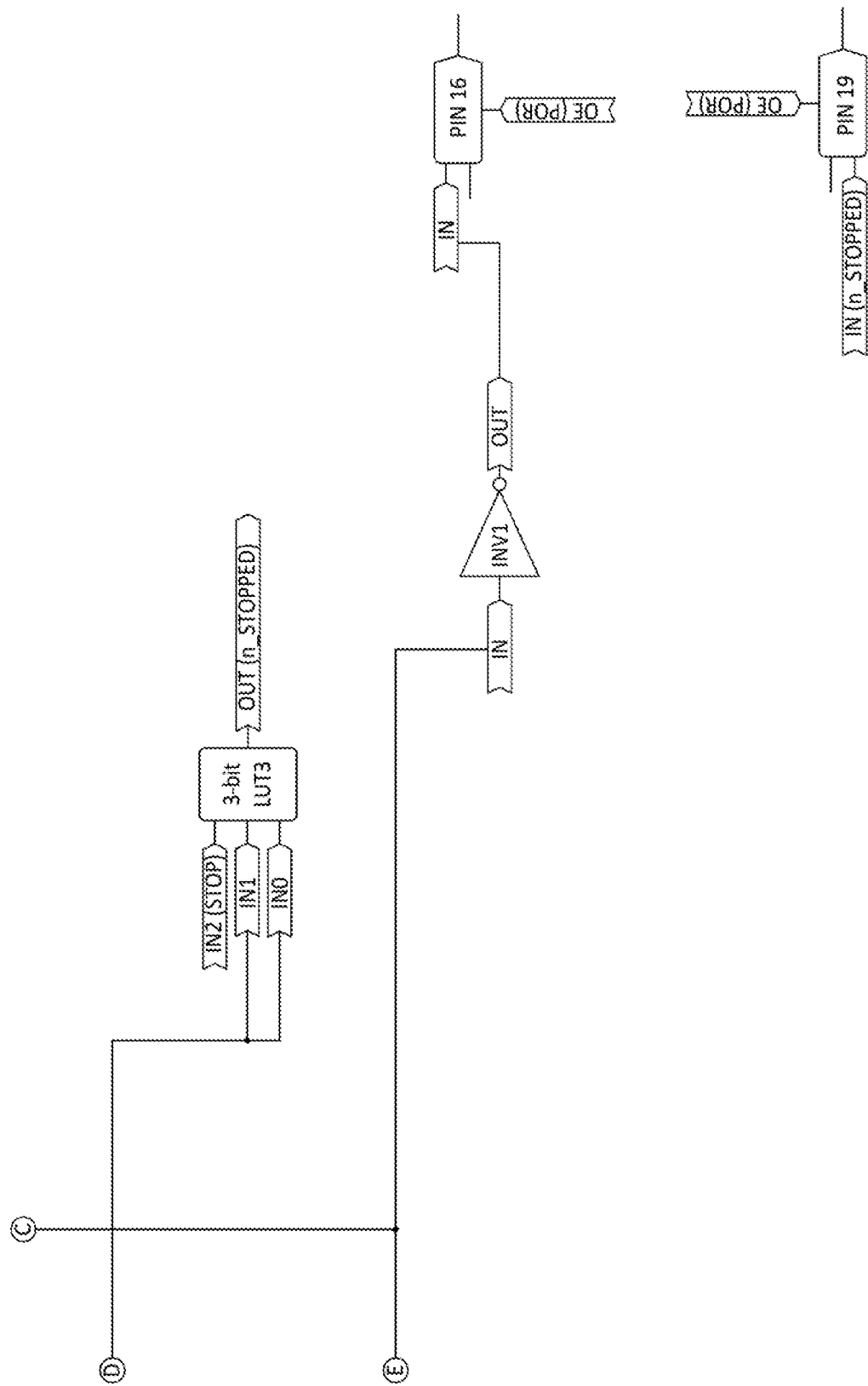

FIG. 5D depicts a portion of the active braking circuit 136 that allows for testing. A fourth logic element LUT3 comprises a first input, a second input, a third input, and a first output. The first input and the second input are connected to pin 20. As described above, pin 20 may be used to test the active braking circuit 136. The third input is connected to the second counter output. The output of the fourth logic element LUT3 is connected to the third input of each of the first logic element LUT0, the second logic element LUT1, and the third logic element LUT4.

Also shown is a first inverter gate INV1 that is connected to the first clock output. The first inverter gate INV1 has an output connected to pin 13. Pin 13 may be connected to another device or system, such as the safety module 214, to allow for monitoring of the active braking system 136. For example, the AMD 104 may use this information to determine whether to attempt to use the active braking circuit 136. If the enable signal is provided, and no response is seen at pin 13, the AMD 104 may attempt to take other action, such as using a primary braking system, trying to swerve the AMD 104 to avoid the obstacle 102, and so forth.

Figure 5E:
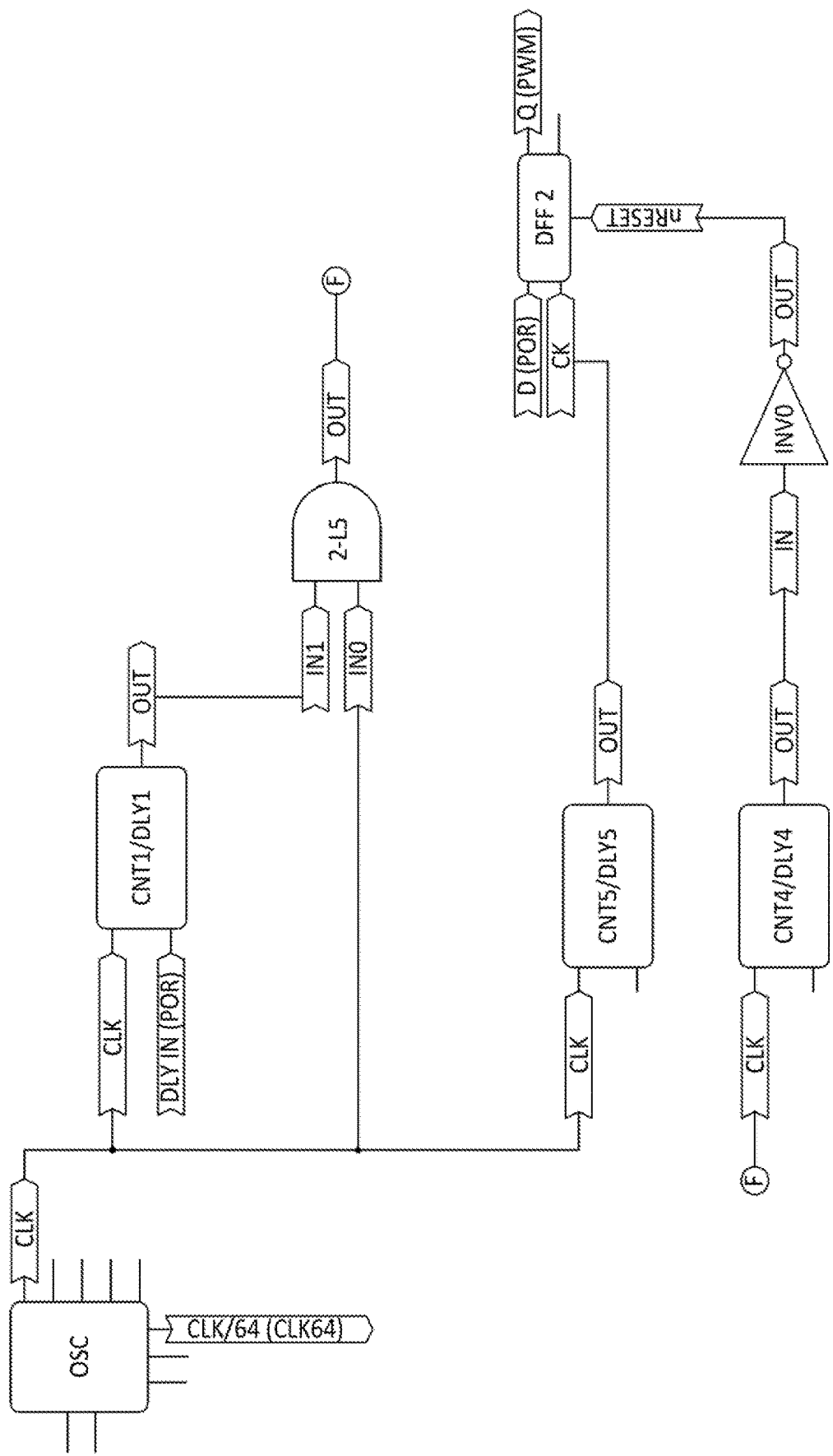

FIG. 5E depicts pulse width modulation (PWM) circuitry of the active braking circuit 136.

An oscillator OSC has a clock output. For example, the oscillator may comprise a 2 MHz oscillator. A third counter CNT5/DLY5 has a third counter input connected to the clock output and a third counter output. A dual flip flop DFF 2 has a first input connected to the third counter output, a reset input, and an output. The output of the DFF 2 provides the PWM signal. The output of the DFF 2 is connected to the first inputs of the first AND gate 3-L5, the second AND gate 3-L6, and the third AND gate 3-L7.

A fourth counter CNT1/DLY1 has a fourth counter input connected to the clock output, a fourth counter input connected to the enable line, and a fourth counter output.

A fourth AND gate 2-L5 has a first input connected to the clock output, a second input connected to the fourth counter output, and a first output.

A fifth counter CNT4/DLY4 has a fifth counter input connected to the first output of the fourth AND gate 2-L5 and a fifth counter output.

A second inverter gate INV0 has a first input connected to the fifth counter output and a first output connected to the reset input of the dual flip flop DFF 2.

The PWM signal produced by the PWM circuitry may operate to control a rate at which the motor 134 stops. For example, the greater the duty cycle of the PWM signal the faster the motor 134 will stop. In some implementations the PWM circuitry may be operated responsive to information, such as distance to an obstacle 102, speed of the AMD 104, and so forth. For example, the PWM signal may be proportionate to the distance to the obstacle 102, so as the distance to the obstacle 102 decreases, the duty cycle of the PWM signal increases.

FIG. 6 illustrates the inputs and corresponding outputs for several logic elements that implement lookup tables (LUTs) used by the active braking circuitry 136 according to some implementations. The LUTs depicted here are configured for use by the circuits described herein, in particular those driving a three-phase BLDC motor. For example, the first logic element LUT0 generates a high signal at the first output of the first logic element LUT0 responsive to a low signal at the first input, a high signal at the second input, and a low signal at the third input. The second logic element LUT1 generates a high signal at the first output of the second logic element LUT1 responsive to a low signal at the first input, a low signal at the second input, and a high signal at the third input. Continuing the example, the third logic element LUT4 generates a high signal at the first output of the third logic element LUT4 responsive to a low signal at the first input, a high signal at the second input, and a low signal at the third input.

In other implementations, such as involving BLDCs with different numbers of phases, the LUTs may be modified.

The active braking circuit 136 may also be used as a primary braking system. For example, during primary braking the active braking circuit 136 may be used to stop the AMD 104. Continuing the example, the PWM circuitry may be controlled such that a first signal is produced at the PWM output during normal braking while a second signal is produced at the PWM output during abrupt braking. A duty cycle of the PWM circuitry may be greater while producing the second signal than while producing the first signal.

The AMD 104 may utilize other active braking circuits 136 to stop other motors 380 in the AMD 104. For example, the mast subsystem 110 may include an active braking circuit 136 for the mast motor used to raise or lower the extensible mast.

The processes discussed in this disclosure may be implemented in hardware, software, or a combination thereof. In the context of software, the described operations represent computer-executable instructions stored on one or more computer-readable storage media that, when executed by one or more hardware processors 116, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

The circuitry presented here is provided by way of illustration and not necessarily as a limitation. The selection of particular components, the values of those components, and so forth may be varied to satisfy different operational conditions. For example, resistor values, selection of particular field effect transistors (FETs), and so forth may vary to allow use with different size motors 134. In some implementations, particular circuits or portions thereof may be replaced with other circuitry of equivalent performance. For example, discrete components may be replaced with an integrated circuit, alternative circuit connections may be used, and so forth.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
    a first logic element having:
        a first input that is connected to a first line, wherein a signal on the first line is representative of a stop condition,
        a second input that is connected to a second line, wherein signals on the second line are based on output from a first sensor indicative of a first position of a rotor of a motor,
        a third input that is connected to a third line, wherein signals on the third line are based on output from a second sensor indicative of a second position of the rotor of the motor, and
        a first output, wherein a high signal having a voltage greater than a threshold value is produced at the first output for a specified combination of inputs at the first, second, and third inputs; and
    a first AND gate having:
        a first input that is connected to an output of a pulse width modulation circuit,
        a second input that is connected to the first output of the first logic element,
        a third input connected to a fourth line, wherein a signal on the fourth line is representative of the stop condition, and
        a first output connected to a first motor driver input.

2. The device of claim 1, further comprising:
    a brushless direct current motor having:
        the first sensor,
        the second sensor, and
        a first terminal; and
    a motor driver having:
        the first motor driver input, and
        a first motor driver output that is connected to the first terminal.

3. The device of claim 1, further comprising:
    a counter having:
        a counter input connected to a fifth line, and
        a counter output connected to the first line, wherein the counter produces a signal at a first time after receiving a stop signal on the fifth line.

4. The device of claim 1, further comprising:
    a counter having:
        a counter input connected to a fifth line, and
        a counter output connected to the fourth line, wherein the counter produces a signal at the counter output for a first interval after receiving a stop signal on the fifth line.

5. The device of claim 1, wherein the first logic element generates a first high signal at the first output of the first logic element responsive to detecting at the first input of the first logic element a first low signal having a voltage less than the threshold value, a second high signal at the second input of the first logic element, and a second low signal at the third input of the first logic element.

6. The device of claim 1, wherein the output of the pulse width modulation circuit controls a rate at which the motor stops.

7. The device of claim 1, the pulse width modulation circuit comprising:
    an oscillator having a clock output;
    a first counter having:
        a first counter input connected to the clock output, and
        a first counter output;
    a dual flip flop having:
        a first input connected to the first counter output,
        a reset input, and
        an output connected to the first input of the first AND gate;
    a second counter having:
        a second counter input connected to the clock output,
        a second counter input connected to the first line, and
        a second counter output;
    a second AND gate having:
        a first input connected to the clock output,
        a second input connected to the second counter output, and
        a first output;
    a third counter having:
        a third counter input connected to the first output of the second AND gate, and
        a third counter output; and
    an inverter gate having:
        a first input connected to the third counter output, and
        a first output connected to the reset input of the dual flip flop.

8. The device of claim 1, wherein the first logic element and the first AND gate are implemented as a complex programmable logic device.

9. A device comprising:
    a first logic element having:
        a first input, wherein first data at the first input is indicative of a stop condition,
        a second input, wherein second data at the second input is indicative of a position of at least a first portion of a rotor of a motor, a third input, wherein third data at the third input is indicative of a position of at least a second portion of the rotor of the motor, and a first output, wherein fourth data is produced at the first output for a specified combination of inputs at the first input, the second input, and the third input; and a second logic element having:

a fourth input that is connected to an output of a first circuit, a fifth input that is connected to the first output, a sixth input, wherein fifth data at the sixth input is indicative of the stop condition, and a second output connected to a first motor driver input.

10. The device of claim 9, further comprising:

a first sensor that generates the second data; and a second sensor that generates the third data.

11. The device of claim 9, wherein the first logic element operates as a look up table and the second logic element operates as an AND gate.

12. The device of claim 9, wherein the first circuit comprises pulse width modulation circuitry, and further wherein the output of the first circuit controls a rate at which the motor stops.

13. The device of claim 9, further comprising:

a brushless direct current motor having:

a first sensor that generates the second data, a second sensor that generates the third data, and a first terminal; and a motor driver having:

the first motor driver input, and a first motor driver output that is connected to the first terminal.

14. The device of claim 9, further comprising:

a first comparator having:

a seventh input connected to a reference voltage source, an eighth input connected to a first sensor, and a first comparator output;

a first XNOR gate having:

a ninth input, wherein sixth data at the first input is indicative of a rotation selection for the motor, a tenth input connected to the first comparator output, and a third output that is connected to the third input;

a second comparator having:

an eleventh input connected to the reference voltage source, a twelfth input connected to a second sensor, and a second comparator output; and a second XNOR gate having:

a thirteenth input, wherein seventh data at the first input is indicative of the rotation selection for the motor, a fourteenth input connected to the second comparator output, and a fourth output that is connected to the second input.

15. The device of claim 9, further comprising:

a counter having:

a counter input, and a counter output connected to the first input, wherein the counter produces sixth data at a first time after receiving data indicative of a stop at the counter input.

16. The device of claim 9, further comprising:

a counter having:

a counter output connected to the sixth input, wherein the counter produces sixth data at the counter output for a first interval after receiving data indicative of a stop.

17. The device of claim 9, wherein the first logic element generates data indicative of a binary 1 at the first output responsive to the first data indicative of a binary 0, the second data indicative of a binary 1, and the third data indicative of a binary 0.

18. A method comprising:

determining a stop condition of an autonomous mobile device (AMD);

responsive to the stop condition, operating a motor control circuit to stop the AMD at a first time;

determining, at a second time, that the AMD is still in motion; and responsive to the AMD still being in motion, operating an active braking circuit by:

determining motor position data indicative of a position of at least a portion of a motor of the AMD that is rotating in a first direction;

determining, based on the stop condition and the motor position data, a first motor driver input; and causing a motor driver to drive the motor in a second direction that is opposite the first direction using the first motor driver input.

19. The method of claim 18, wherein the stop condition is indicative of one or more of:

expected collision of the AMD with an object, collision of the AMD with the object, receipt of a command to stop movement of the AMD, or failure of one or more components of the AMD.

20. The method of claim 18, further comprising:

determining a distance to an obstacle;

determining, based on the distance, a pulse width modulation rate; and wherein the first motor driver input is determined based at least in part on the pulse width modulation rate.

* * * * *